May 27, 1952 W. J. B. JANSEN 2,598,552
MEASURING APPARATUS HAVING INVERTED PENDULUM INDICATOR
Filed Nov. 5, 1946 2 SHEETS—SHEET 1
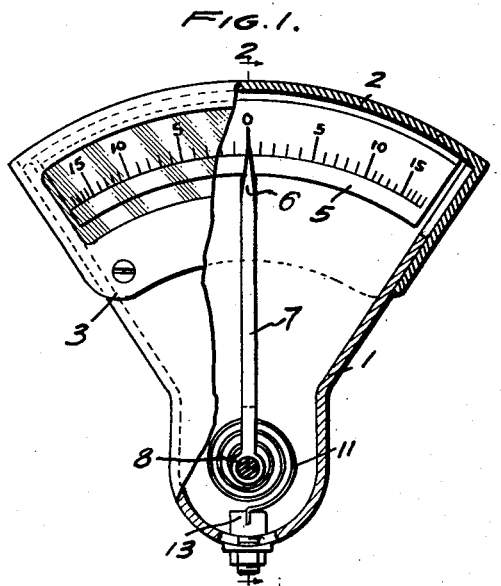
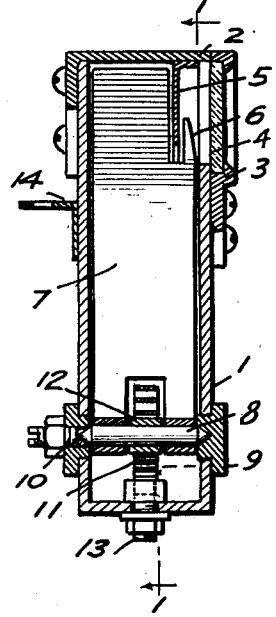
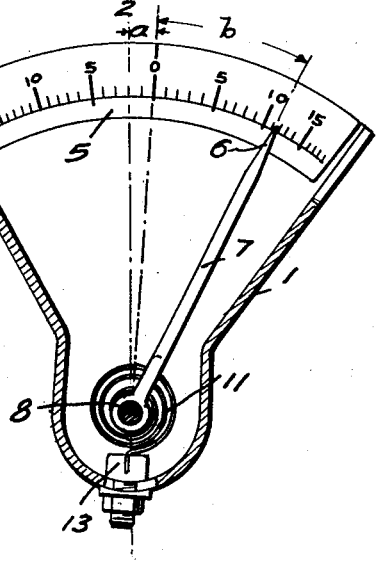
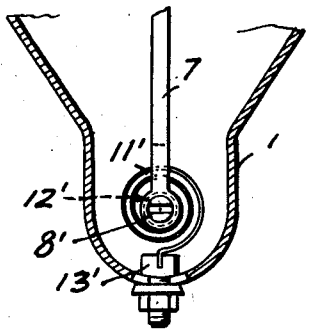
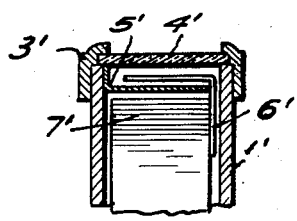
INVENTOR:
Willem J. B. Jansen,
By Pierce, Scheffler & Parker,
ATTORNEYS.

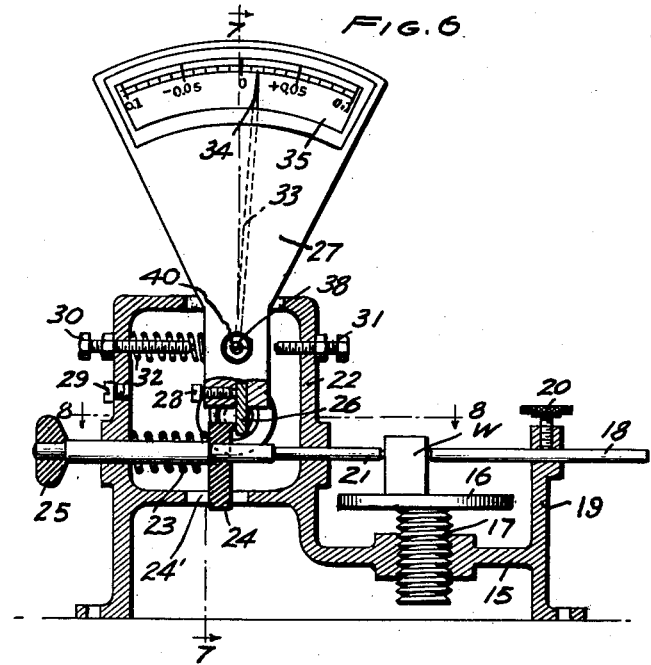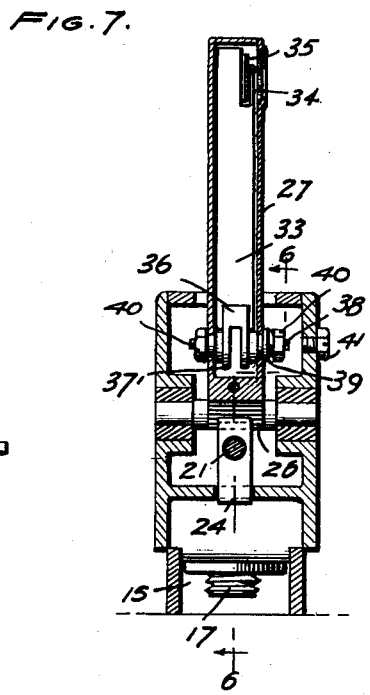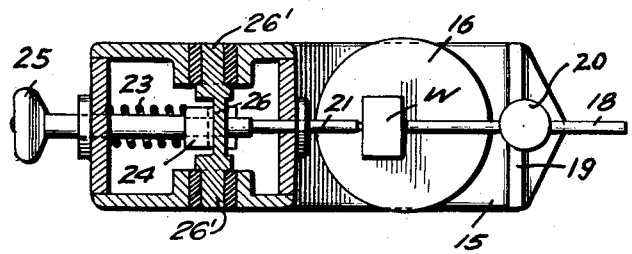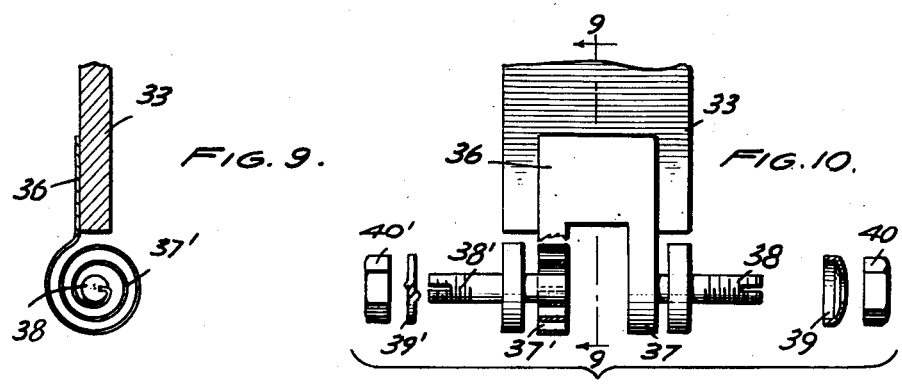

Patented May 27, 1952

2,598,552

UNITED STATES PATENT OFFICE 2,598,552

MEASURING APPARATUS HAVING INVERTED PENDULUM INDICATOR

Willem J. B. Jansen, Haarlem, Netherlands

Application November 5, 1946, Serial No. 707,802
In Switzerland November 6, 1945

10 Claims. (Cl. 33—172)

This invention relates to measuring apparatus, and particularly to apparatus for measuring small angular or linear displacements.

An object of the invention is to provide measuring apparatus in which an indicating member is supported within a casing for angular movement about a horizontal axis located below the center of gravity of the indicating member, and a spring opposes angular displacement of the indicating member when the casing is tilted, the arrangement being such that the indicating member displacement is substantially greater than the angular displacement of the casing. An object is to provide measuring apparatus of the type stated in which the casing forms a damping chamber and the indicating member itself constitutes the damping vane. An object is to provide measuring apparatus of the pendulum type in which a pivotally supported member constitutes an inverted pendulum element, a damping vane and a pointer for cooperation with a graduated scale. A further object is to provide measuring apparatus of the comparator gage type in which a casing is moved angularly by a gage tip which contacts a work piece, and indicating mechanism within the casing amplifies the angular movement of the casing.

These and other objects and advantages of the invention will be apparent from the following specification when taken with the accompanying drawings in which:

Fig. 1 is a front elevation of a measuring apparatus embodying the invention, with some parts shown in section as seen on the plane of line 1—1 of Fig. 2;

Fig. 2 is a vertical section through the measuring apparatus as seen on the plane of line 2—2 of Fig. 1;

Fig. 3 is a sectional view similar to Fig. 1 but showing the apparatus inclined clockwise at an angle a;

Figs. 4 and 5 are fragmentary sectional views showing other embodiments of the invention;

Fig. 6 is an elevation, with parts in section on line 6—6 of Fig. 7, of a comparator gage embodying the invention;

Fig. 7 is a vertical section as seen on the plane of line 7—7 of Fig. 6;

Fig. 8 is a horizontal section as seen on the plane of line 8—8 of Fig. 6;

Fig. 9 is a fragmentary sectional view of the spring mounting of the indicating member, the parts being shown on an enlarged scale and as seen in section on line 9—9 of Fig. 10; and Fig. 10 is an exploded fragmentary elevation of the mounting, with some parts in section.

In Figs. 1 to 4 inclusive, the reference numeral 1 identifies a casing which is provided at its upper end with a cover 2 and front plate 3 of arcuate form. The front plate has an arcuate opening and glass window 4 in front of a graduated scale 5 which is cemented or otherwise mounted on the cover 2. The cooperating pointer 6 is preferably an integral part of an indicating member 7 which is a plate of generally rectangular form having a shaft 8 extending through and fixed to its lower end. Bearings 9, 10 for the shaft are mounted in the front and back walls of the casing 1, the bearing 10 being adjustable to provide a relatively friction-free pivotal support for the shaft 8 and indicating member 7.

The axis of the shaft 8 is horizontal when the apparatus is in use, and the member 7 acts as an inverted pendulum as its center of gravity is above the axis of shaft 8. The inner end of a spiral spring 11 is secured to a hub 12 which is fixed to the shaft 8, and the outer end of the spring is secured to a stud 13 which extends through and is angularly adjustable along an arcuate slot in the lower end of the casing 1.

The indicating member 7 is relatively wide, as measured parallel to the axis of shaft 8, and its shape is so related to the cross-section of the casing 1 that only a small clearance is left between the indicating member and the walls of the casing, see Fig. 2. The indicating member 7 thus constitutes a damping vane to preclude oscillation of the indicating member 7 and pointer 6 when the apparatus is subjected to sharp shocks and/or continuous vibration.

The apparatus as described may be employed as a clinometer or mechanics' level when secured to a straight-edge base, as an inclinometer when mounted on an automobile, as the indicator for precision balances, or as a gage to calibrate a series of work pieces. A bracket 14 may be soldered or otherwise secured to the rear wall of the casing 1 for attaching the measuring apparatus to a base or to the instrument panel of a vehicle.

The apparatus operates in the following manner to provide an angular pointer displacement along the scale 5 which is an amplification of the angular displacement of the casing 1 about the shaft 8, or about an axis parallel to the axis of the shaft 8. The apparatus is first checked by turning the casing 1 to its normal vertical position, as in Fig. 1, with the axis of the shaft 8 horizontal and the zero scale graduation directly above that axis. The pointer 7 should be at the center zero mark of the scale 5 and, if necessary, the anchor stud 13 of spring 11 is adjusted to aline the pointer with the zero mark. This zero corrector adjustment brings the center of gravity of the indicating system into the vertical plane of the axis of shaft 8, and therefore the weight of the indicating member does not tend to rotate the member about the axis of shaft 8. The spring 11 is unstressed in this normal zero condition of the apparatus. If the casing 1 is turned clockwise through a small angle $a$, the spring 11 is stressed and develops a torque which initiates a clockwise movement of the indicating member 7 out of the dead-center position. The member 7 acts as an inverted pendulum, and the initial displacement therefore results in a gravity-produced couple which effects a further displacement of the member 7 which is opposed by a balancing couple developed by the spring 11. The pointer 6 is quickly displaced to a stable position along the scale plate 5 as overswing and vibration are prevented by the self-damping of the member 7 which has a relatively close fit in the casing 1.

The angular displacement $b$ of the pointer is substantially greater than the angular displacement $a$ of the casing 1, and the amplification factor is determined by the weight of the pointer 6 and member 7, the lever arm through which that weight acts, i. e. the distance between the center of gravity of the indicating system and the axis of the shaft 8, and the strength or displacement-torque characteristic of the spring 11. These values may be selected in various relationships to obtain the amplification factor which is desired for the particular measuring apparatus.

Other forms of pivotal mountings for the indicating member 7 may be used, for example a knife-edge support or ball bearings, or as shown in Fig. 4, the member 7 may be supported by the balancing spring 11'. The inner end of the spring is secured to hub 12' which is fixed to the lower end of the member 7 by a stud or screw 8', and bearings such as illustrated in Fig. 2 are not required in this embodiment of the invention.

It is preferable in some applications of the invention to employ a drum or cylindrical type of scale such as shown in Fig. 5. A curved cover 3' and correspondingly curved glass 4' are secured over the open upper end of the casing 1', and a cylindrical scale plate 5' is mounted on the back wall of the casing. The pointer 6' is soldered or brazed to the upper forward face of the indicating member 7', and is bent rearwardly to extend over the scale plate.

The described apparatus may be employed to advantage in a comparator gage as the motion-multiplying action is obtained without the use of gear trains or lever systems. A comparator gage in which the amplification is obtained in accordance with this invention combines the advantages of small size, economical construction, high sensitivity and high accuracy.

As shown in Figs. 6, 7 and 8, the comparator gage includes a base 15 on which a work table 16 is supported for vertical adjustment, the table being preferably carried by a post 17 which is threaded into the base. A relatively fixed gage rod 18 is slidably mounted in a flange 19 which extends upwardly from one side of the base 15, and the rod is secured to the flange by a clamp screw 20 to serve as a stop for a work piece W. The movable gage tip 21 is a rod which is slidably supported in a housing 22 at the other side of the base 15. The gage tip 21 is pressed towards the gage rod 19 by a spring 23 which is seated between the housing wall and a presser plate 24 which is secured to the gage tip by a friction fit or a set-screw, not shown. The gage tip may be manually retracted by a knob 25 for the insertion and removal of the work pieces which are to be measured. The presser plate 24 is of rectangular shape and its lower end extends through a slot 24' in the base 15 to prevent angular movement of the plate.

The presser plate 24 is of hard steel and has a thin upper lip for engagement with a rocker plate 26 which is supported, and preferably by journals 26' integral with the plate 26, mounted in the front and rear walls of the housing 22. The axis of rocking movement of the plate 26 is above the lip of the presser plate 24, and the rocking plate is therefore turned counterclockwise when engaged by the presser plate upon movement of the gage tip 21 to the right. The casing 27 of an angle measuring device is rigidly mounted upon the rocking plate 26 to provide a greatly amplified indication of angular movements of the rocking plate which correspond to small variations in the thickness of the work pieces, for example to thickness variations of the order of a few thousandths of an inch.

As shown in Fig. 6, the base of the casing 27 is slotted to fit upon the upper end of the rocking plate 26, and screws 28 are threaded into the base to clamp the casing to the plate. Removable plugs 29 are provided in the end wall of the housing 22 to permit access to the clamp screws. Stop screws 30, 31 extend through the side walls of the housing 22 for limiting the rocking movement of the casing 27, or both screws may be adjusted into engagement with the casing when the apparatus is to be moved from one point to another in the shop. A spiral compression spring 32 is arranged about the stop screw 30 and urges the casing clockwise towards the stop screw 31.

The indicating member 33 is a generally rectangular plate which has a relatively close fit within the casing 27 to serve as a damping vane as well as an inverted pendulum which is supported for movement about an axis parallel to the axis about which the plate 26 rocks. The member 33 is notched at its upper end to provide a pointer 34 and to clear the scale plate 35 which is fixed to the casing 27.

The inverted pendulum member 33 is preferably mounted directly upon the balance spring, as shown in Figs. 7, 9 and 10. The cross-bar 36 of the spring member is soldered or brazed to the lower end of the indicating member 33, and the side sections 37, 37' of the spring are spirally coiled and secured to studs 38, 38'. The reduced diameter outer ends of the studs 38, 38' are threaded and extend through alined openings in the front and rear walls, respectively, of the casing. The front wall of the casing 27 is removable to permit the assembly of the indicating member and the spring within the casing, and the front wall is detachably secured to the casing by any appropriate means, not shown. The outer end of each stud is provided with a kerf or other non-circular recess to receive a screwdriver or tool for preventing rotation of the stud when washers 39, 39' and nuts 40, 40' are applied to secure the stud in the casing wall. The washer 39 is a spring washer which is compressed to such extent that the stud 38 is frictionally held against angular movement by shock and vibration but may be adjusted angularly by a screwdriver to set the pointer 34 at the zero scale graduation when the casing 27 is in its normal zero position. The screwdriver or tool for making this zero correction is introduced through an opening in the front wall of the housing 22, and this opening is normally closed by a threaded plug 41. A similar arrangement may be provided for the rear stud 38' but, in general, adequate zero correction may be had by adjusting only one of the coil springs. It therefore is preferable to use a lock washer 39' and clamp the stud 38' firmly in the rear wall of the casing 27.

The comparator gage is adjusted for measuring a series of work pieces W by turning the stop screw 31 inwardly to rock the casing 27 into its normal zero position, i. e., to set the zero scale graduation directly over the axis of the studs 38, 38' and, if necessary, turning the stud 38 to bring the pointer 34 to the zero scale mark. The stop screw 31 is backed off, and an accurately sized work piece, or a precision gage block of the desired standard thickness, is then placed upon the work table 16 between the relatively stationary gage rod 18 and the movable gage tip 21. The gage rod 18 is adjusted to such position that the pointer 34 stands at the center zero scale graduation, and is clamped in that position by the screw 20. The gage tip 21 is then drawn back, thereby permitting spring 32 to rock the casing 27 clockwise into contact with the stop 31, the standard or gage block removed, and a work piece W placed on the table. On release of the knob 25, the gage tip 21 is moved into engagement with the work piece W by the spring 23 and the presser plate 24 engages the rocker plate 26 to rock the same counterclockwise through an angle which is determined by the position of the gage tip 21, i. e. by the thickness of the work piece W. If the work piece is accurately sized, the casing 27 will be returned to normal zero position and the pointer 34 will aline with the zero mark of the scale 35. The angular displacement of the casing 27, and the corresponding amplified displacement of the pointer 34, will be counterclockwise if the work piece under measurement is of less thickness than the desired value, and clockwise if the work piece is of excess thickness.

The particular work piece W which is illustrated in Fig. 6 is somewhat thicker than the preselected standard thickness as the pointer 34 is one and a half graduations clockwise from the zero center mark of scale 35. The end markings of the scale 35 may represent the maximum allowable tolerance or preferably, as shown in Fig. 6, the scale 35 is graduated in absolute values of length. The measuring range of the illustrated scale 35 is ±0.1 mm., and each graduation corresponds to 0.01 mm. The work piece W of Fig. 6 is therefore oversize by 0.015 mm. The amplification factor of the illustrated indicating assembly is 10 as the casing displacement of ±1.5° results in a pointer displacement of ±15°.

The amplification factor depends upon the torque-angular displacement characteristics of the inverted pendulum member 33 and of the balancing springs 37, 37', as stated above with reference to the previously described embodiments, and a further amplification depends upon the "lever arm" of the presser plate 24, i. e. upon the spacing of the contact lip of the presser plate 24 from the pivotal axis of the rocking plate 26. This latter amplification is fixed by the mechanical construction of the gage tip 21, presser plate 24 and rocking plate 26, but the overall amplification factor of the comparator gage may be varied by providing a plurality of inverted pendulum clinometers, of different measuring sensitivity, for use with a comparator base assembly. For example, if the manufacturing tolerance is ±0.2 millimeter, a clinometer with a lower amplification factor of 5 to 1 may be substituted for the casing 27 and enclosed measuring system of Figs. 6 to 8.

It is to be understood that the invention is not limited to the particular apparatus herein shown and described as various changes may be made within the spirit and scope of the invention as set forth in the following claims.

I claim:

1. Measuring apparatus of the type comprising a casing adapted to be tilted about a horizontal axis, an indicating member within said casing and means pivotally mounting the same for angular movement about a horizontal axis below the center of gravity of the indicating member, balance spring means having one end connected to said indicating member, and means supporting the other end of said balance spring means on said casing to oppose angular movement of said indicating member by gravity; characterized by the fact that said spring means constitutes said means supporting said indicating member for angular movement about a horizontal axis.

2. Measuring apparatus as recited in claim 1 wherein a scale is carried by said casing, and said supporting means is adjustable on said casing to determine the position of said indicating member along said scale when said casing is in normal zero position.

3. Measuring apparatus as recited in claim 1 wherein said casing includes an arcuate portion substantially concentric with the horizontal axis of said indicating member, and said supporting means is secured to and angularly adjustable on said arcuate portion of the casing.

4. Measuring apparatus as recited in claim 1 wherein said spring means is a spiral form and has its inner end secured to said indicating member and its outer end fixed to said supporting means.

5. Measuring apparatus as recited in claim 1, wherein said spring means is a spiral form and has its outer end secured to said indicating member and its inner end fixed to said supporting means.

6. Measuring apparatus as recited in claim 1, in combination with means for damping oscillation of said indicating member upon a tilting movement of said casing.

7. In a comparator gage, the combination with a base, and a gage tip supported on said base for movement into contact with a work piece, of a casing and means supporting the same on said base for rocking movement about a horizontal axis, spring means urging said casing angularly in one direction, cooperating means on said gage tip and said casing for moving said casing angularly in the opposite direction against the force exerted by said spring means on movement of said gage tip into contact with a work piece, an inverted pendulum member mounted within said casing for movement about a horizontal axis, a graduated scale carried by said casing, a pointer movable along said graduated scale by said pendulum, and a balance spring connected between said casing and said pendulum to oppose gravity-produced movement of said pendulum member.

8. In a comparator gage, the combination with a base, a gage tip supported on said base for rectilinear movement, a presser plate on said gage tip, and a casing and means supporting the same for angular movement about a horizontal axis by said presser plate, of motion-multiplying indicating mechanism within said casing comprising a graduated scale member and a cooperating indicating member, and means supporting one of said members on said casing for angular movement about a horizontal axis by gravity in response to angular movement of said casing, the other member being carried by the casing.

9. In a comparator gage, the combination with a base, a gage tip supported on said base for rectilinear movement, a presser plate on said gage tip, a casing, and means supporting the casing for angular movement about a horizontal axis by said presser plate; of a motion-multiplying indicating mechanism comprising a graduated scale carried by the casing, an inverted pendulum within said casing supported for angular movement about a horizontal axis below its center of gravity, an indicating member carried by said inverted pendulum for cooperation with said graduated scale, and a balance spring opposing angular movement of said inverted pendulum member by gravity.

10. In a comparator gage, the invention as recited in claim 9, wherein said balance spring comprises a spiral spring having one end secured to said casing and its other end secured to said inverted pendulum, said spring constituting per se means supporting said inverted pendulum and indicating member for angular movement about a horizontal axis.

WILLEM J. B. JANSEN.

REFERENCES CITED

The following references are of record in the file of this patent:

UNITED STATES PATENTS

| Number | Name | Date |
| --- | --- | --- |
| 353,561 | Hurst | Nov. 30, 1886 |
| 447,276 | Brayton | Feb. 24, 1891 |
| 496,272 | Miebach | Apr. 25, 1893 |
| 523,404 | Meady | July 24, 1894 |
| 526,105 | Hollister | Sept. 18, 1894 |
| 1,154,396 | Hayot | Sept. 21, 1915 |
| 1,264,910 | Elsasser | May 7, 1918 |
| 1,300,513 | Taylor | Apr. 15, 1919 |
| 1,661,214 | Carpenter | Mar. 6, 1928 |
| 1,708,900 | Roller | Apr. 9, 1929 |
| 1,801,812 | Hill | Apr. 21, 1931 |
| 2,254,242 | Righi | Sept. 2, 1941 |
| 2,264,640 | Powers | Dec. 2, 1941 |
| 2,420,711 | Look | May 20, 1947 |